United States Patent [19]

Hatazawa

[11] Patent Number: 4,635,212

[45] Date of Patent: Jan. 6, 1987

[54] METHOD FOR GENERATING A ROTATED PRINT PATTERN

[75] Inventor: Kikuo Hatazawa, Atsugi, Japan

[73] Assignee: Hitachi, Ltd., Tokyo, Japan

[21] Appl. No.: 449,668

[22] Filed: Dec. 14, 1982

[30] Foreign Application Priority Data

Dec. 25, 1981 [JP] Japan ............................ 56-209216

[51] Int. Cl.$^4$ .................... G06F 15/40; G06F 15/626
[52] U.S. Cl. .................................. 364/518; 364/519; 382/44
[58] Field of Search ............................. 364/518–523; 340/724, 725, 727, 739; 382/44, 46

[56] References Cited

U.S. PATENT DOCUMENTS

| | | | |
|---|---|---|---|
| 3,378,819 | 4/1968 | Hannicq et al. ............. | 364/200 |
| 3,809,868 | 5/1974 | Villalobos et al. .......... | 364/518 |
| 4,168,488 | 9/1979 | Evans ........................ | 340/727 X |
| 4,271,476 | 6/1981 | Lotspiech ................... | 340/727 X |
| 4,312,045 | 1/1982 | Jean et al. ................. | 364/518 X |

OTHER PUBLICATIONS

IBM Tech. Disclosure, Apr. 1982, (vol. 24, No. 11B); "Print Rotation Technique", pp. 5953–5954.
Hewlett-Packard Journal (USA), Nov. 1978, (vol. 29, No. 15); "Managing Dot-Matrix Printing with a Microprocessor", pp. 8–19.

Primary Examiner—Errol A. Krass
Assistant Examiner—Kevin J. Teska
Attorney, Agent, or Firm—Antonelli, Terry & Wands

[57] ABSTRACT

In order that print data edited by a host computer may be printed out by means of a printer having a shorter printing width than the length of the character line thereof, the edited print data is converted into a print pattern in an arrangement which is rotated by 90 degrees. This conversion is conducted by determining the coordinate positions of dots when the edited data is converted into a print pattern without being rotated, by rotating the coordinate positions by 90 degrees to determine the addresses of the rotated coordinate positions, and by writing these positions in the addresses of a page memory for writing the print pattern for one page. The print pattern is read in the order of the addresses out of the page memory and is fed to a printer.

3 Claims, 7 Drawing Figures

METHOD FOR GENERATING A ROTATED PRINT PATTERN

BACKGROUND OF THE INVENTION

1. Field of the Invention

The present invention relates to a controller for a laser beam printer and, more particularly, to a system for controlling the arrangement of a print pattern in a page memory.

2. Description of the Prior Art

In a printer according to the prior art, in which a print pattern is edited and printed for each page, the printing width in the direction of a line is determined by the effective printing width of the printing unit of the printer, thus making it impossible to print a line longer than the effective printing width.

FIG. 1 shows the construction of a laser beam printer. This printer is connected with a host computer 100 and a printer controller 200 and is equipped with a laser oscillator 301, a laser modulator 302, a reflecting mirror 303, a rotary mirror 304, a focusing lens 305, a photosensitive drum 306 and a developer 307.

The coded printing information fed from the host computer 100 is converted into a print pattern and edited by the printer controller 200, and this print pattern is fed as an image signal to the laser modulator 302. On the other hand, the laser beam coming from the laser oscillator 201 is turned on and off by the laser modulator 302 in a manner to correspond to the white and black of the print pattern and is guided onto the rotary mirror 304 by the reflecting mirror 303. The beam thus reflected is focused by the focusing lens 305 to form a latent image on the photosensitive drum 306. The latent image thus formed on the photosensitive drum 306 is developed into a visible image by the developer 307 and is transferred to a sheet of print paper, thus completing the printing operation.

It is apparent that the printing width of the printer for one line cannot exceed the length of the photosensitive drum.

SUMMARY OF THE INVENTION

It is, therefore, an object of the present invention to provide a printer controller which enables the aforementioned printer to generate an image signal for printing a character line longer than the photosensitive drum.

Another object of the present invention is to generate a print pattern which is so edited that the character lines are arranged at a right angle with respect to the line scanning direction of the laser beam.

In the printer controller for receiving the print data which is edited and transferred in the order the character lines, according to the present invention, the received data is converted into a print pattern which is expressed in terms of the existence of dots, and coordinate information expressed by (X, Y) is given to each of the dots and is rotated by 90 degrees to determine a new coordinate so that the printing operation is conducted in accordance with the renewed coordinate. As a result, one page of print paper is printed with the data which has been rotated by 90 degrees with respect to the received data.

DESCRIPTION OF THE PREFERRED EMBODIMENT

Figure 2:
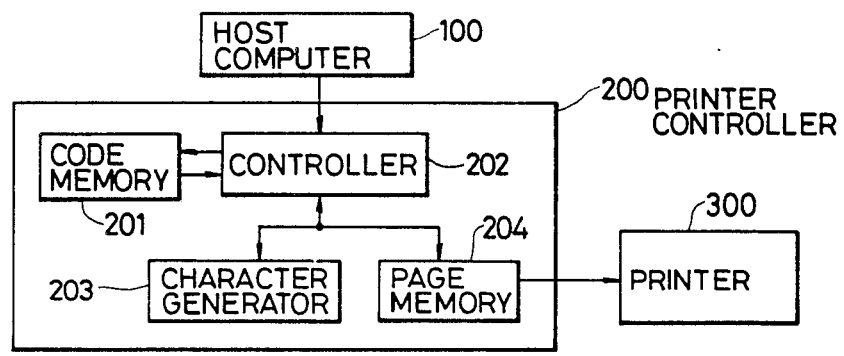
FIG. 2 is a block diagram showing a printer controller.

The host computer 100 is made operative to edit the print data in the order of the character lines and to transfer the edited print data to the printer controller in the same order. This ordering is necessary for facilitating the editing operation. FIG. 2 shows the construction of the printer controller 200. With this printer controller 200, the host computer 100 is connected as a master unit and a printer 300 is connected as a slave unit. In the printer controller 200, a code memory 201 operates as a memory for storing the print data for one page, which has been received from the host computer 100, in the form of a character code; a character generator 203 operates as a memory for storing a print pattern corresponding to each character code; and a page memory 204 operates as a memory for storing the dot information, which is used to print one page of print paper, in bit patterns of "1" and "0" corresponding to the respective dots. The controller 202 writes a series of the character codes, which are received from the host computer, in the code memory 201. Next, the controller 202 reads the character codes one by one out of the code memory 201, reads the character pattern corresponding to the character codes out of the character generator 203, calculates the written position of said character pattern on the page memory 204, and arranges said character pattern in the page memory 204. Thus, the controller 202 addresses the character pattern for each character in the page memory 204 and feeds a command to the printer 300, when the print data for one page has been addressed in the page memory 204, thereby starting the printing operation.

The printing position of a character on the print paper 308 is determined by the address of the page memory 204 in which the character is stored. This determination will be described in detail with reference to FIG. 3 which schematically shows the format of the page memory 204 in an enlarged scale. The 0th to 399th bytes are areas which correspond to a scanline 0 of the print paper and which can store information of 400 bytes, i.e., 3200 dots. Dots of circles without any print are stored to correspond to "0" whereas solid dots are stored to correspond to "1". Likewise, a scanline 1 can store the 400th to 799th bytes, i.e., the dot information of 400 bytes. Likewise, each scanline can store the dot information of 400 bytes. The following example is directed to the case in which each character pattern is formed with a square of 32×32 dots. If, in a usual case, the arrangement of a certain character pattern is started at the 1202th byte of the page memory 204, the highest dot line of the character pattern is written in the four bytes from the third byte of a scanline 3, i.e., bytes 1202th to 1205th bytes, and the next to the top dot line of the character pattern is arranged in a scanline 4. The writing address is 4 bytes consisting of 1602th to 1605th bytes. If these writing operations are similarly continued, the writing address of the last dot line of the character pattern is 4 bytes which begins from $1202 + 400 \times 31 = 2082$. Thus, since the arrangement of the character pattern in the page memory effects the assignment of the scanlines and the determination of the dot positions, it is understood that the printing position of the character on the print paper 308 is determined by the character pattern writing address on the page memory 204. Incidentally, the foregoing description is exemplified for simplicity of explanation by the case in which each scanline is composed of 400 bytes, i.e., 3200 dots and in which the character pattern of one character is composed of 32×32 dots. Generally speaking, however, like discussion applies to the case in which each scanline is composed of N bytes and in which each character pattern is composed of n×n dots.

In this manner, the print data of one page of the code memory 201 is converted into a pattern (i.e., image data) and is arranged on the page memory.

In the usual case, the arrangement of the print data, which has been edited by the host computer 100 and written in the code memory 201, is the same as that stored in the page memory 204.

Despite this fact, when the processing of the present invention is to be executed, the real arrangement on the page memory 204 is rotated by 90 degrees from the arrangement (i.e., the virtual arrangement) which has been edited by the host computer 100.

Figure 1:
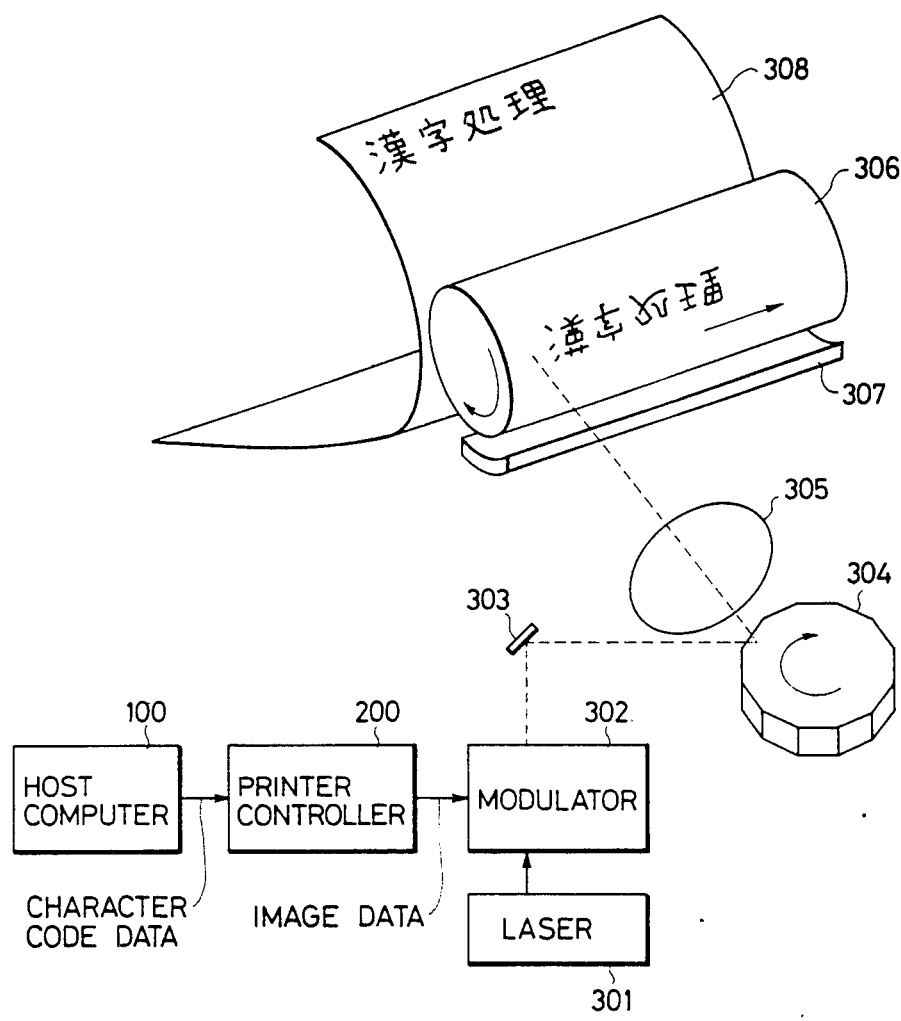
FIG. 1 is a schematic view showing a laser beam printer system.
Figure 4:
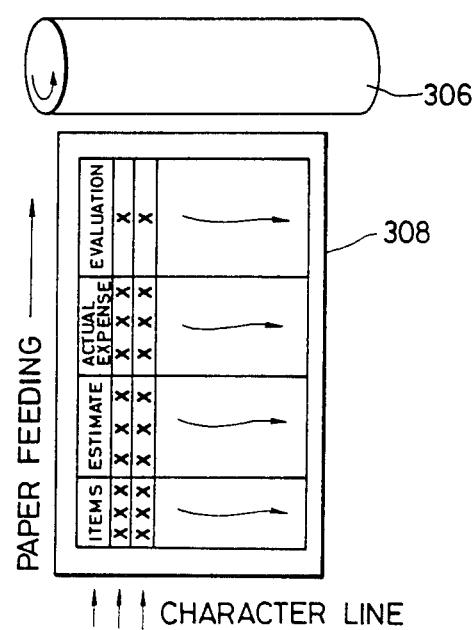
FIG. 4 is a view showing the printing operation of the present invention.
Figure 5:
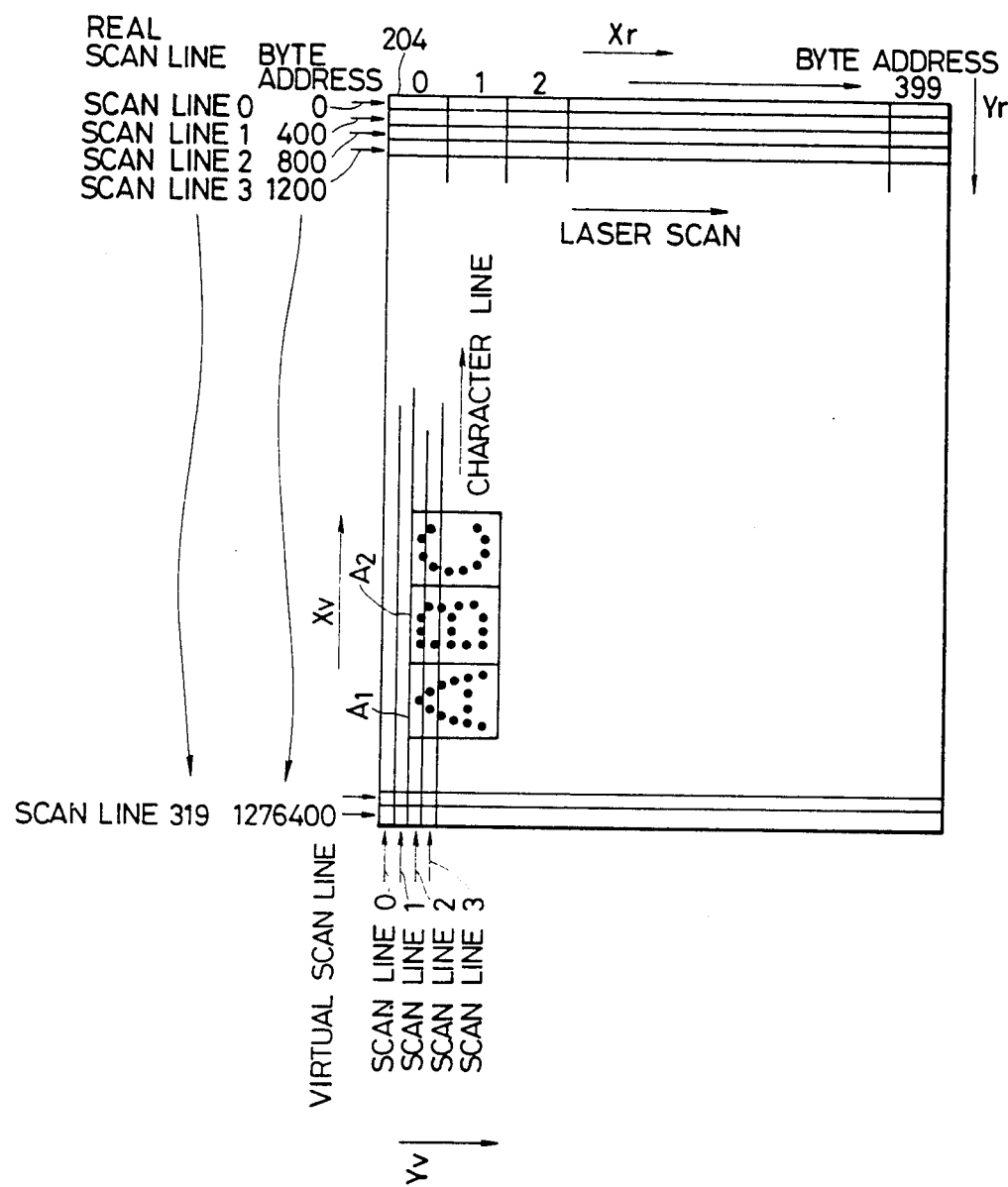
FIG. 5 is a view showing the detail of the arrangement in the page memory of the present invention.

Next, the concept of the rotational transformation of a page according to the present invention will be described with reference to FIGS. 4 and 5. If the print paper 308 is fed in the direction of the longer side of an document sheet with respect to the photosensitive drum 306 and if the character lines on the document are arranged in the paper feeding direction, as shown in FIG. 4, a printing line which is longer than the photosensitive drum can be realized. FIG. 5 is a view illustrating the method for arranging the character pattern in the page memory 204. The bit address of the page memory is ordered in an increasing manner in accordance with the scanning direction of the laser. If the example of FIG. 1, in which each scanline is composed of 400 bytes, i.e., 3200 dots, is also used here, the 0th to 399th bytes on the page memory are assigned to the scanline 0. 400 bytes are similarly assigned to each of the lines following the scanline 0. Since the example of FIG. 4 is assumed such that one page is composed of 3192 scanlines, the highest scanline of the page is the 3191th one. It is here assumed that the scanlines and their numbers taken in the scanning direction of the laser are called "real scanlines" and "real scanline numbers", respectively. On the contrary, virtual scanlines are newly introduced so as to accommodate the character pattern arrangement of the present invention. The virtual scanlines are provided to start their character lines from the lower lefthand corner of the print paper, as shown in FIG. 5. In other words, the virtual scanlines have character lines which are rotated by 90 degrees. Those virtual scanlines are ones which are given if it is assumed that the print data edited by the host computer is arranged without being rotated in the page memory.

The bit address 0 of the page memory is taken at an origin, and a Y axis is taken in the direction in which the real scanline number increases whereas an X axis is taken in the direction in which the positions of the printing dots rise. And, the dot position in this coordinate system is expressed by (Xr, Yr). In the conventional case in which the character line direction and the laser scanning direction are coincident, the address (i.e., the bit address) A of the print pattern is expressed by the following equation:

$$A = 3200\ Yr + Xr.$$

In this equation, letters Yr indicate the real scanline number, which is limited by $0 \leq Yr \leq 3191$ in the example of FIG. 5, and letters Xr indicate the bit position for starting the print pattern, which is also limited by $0 \leq Xr \leq 3199$.

Figure 3:
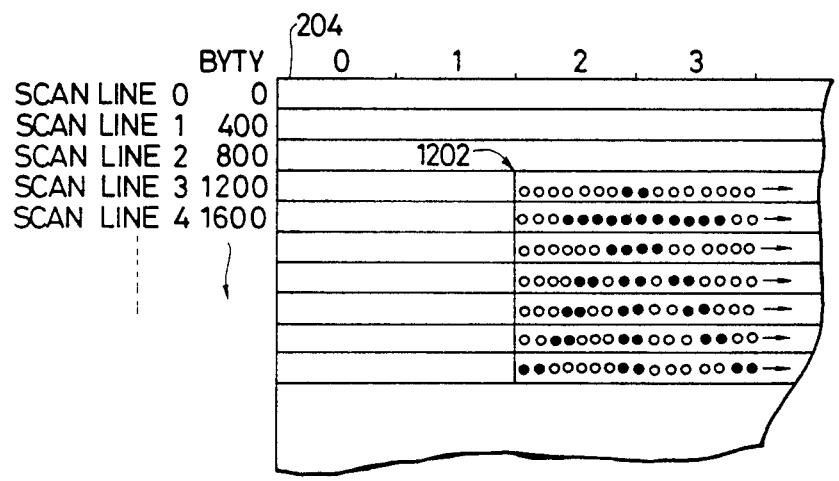
FIG. 3 is a view for illustrating the arrangement in a page memory.

Likewise, the bit address 3200×3191 of the page memory is taken at the origin, and the Y axis is taken in a direction for the virtual scanline number to increase whereas the X axis is taken in a direction for the character dot position in each virtual scanline to rise. And, the dot position in this coordinate system is expressed by (Xv, Yv). Then, this expression (Xv, Yv) indicates the coordinate position when the virtual arrangement edited by the host computer is addressed as it is on the page memory, as has been described above, and the scanline number and its bit position can be determined from the given byte address, as shown in FIG. 3. As a result, this determination can be executed from the data coming from the host computer by the calculations of the prior art.

In the case of the present invention, the bit address rotated by 90 degrees from the virtual arrangement A is expressed by the following equation:

$$A = 3200 \times 3191 + Yv - 3200Xv$$

In this equation, letters Yv indicate the virtual scanline number, which is limited by $0 \leq Yv \leq 3199$ in the example of FIG. 5, and letters Xv indicate the bit position for starting the print pattern, which is also limited by $0 \leq Xv \leq 3191$. Incidentally, upon the arrangement of the actual print pattern, it is not always necessary to conduct the calculation for each character in accordance with the foregoing Equations. For example, if the characters have an equal size and a zero spacing, the address $Ai+1$ of the $(i+1)$th character is calculated by the following equation when the address Ai of the preceding ith character is given:

$$Ai+1 = Ai - 3200 \times \text{(the dot number in the character width)}.$$

The arrangement of the print pattern on the page memory means that the whole print pattern read out of the character generator 203 is so written in a predetermined position of the page memory as to have the same shape as that to be printed on the book. This meaning will be supplementarily explained in the following. First of all, in the case of the prior art, the print pattern to be arranged in the page memory 204 is that which has the usual character direction. In the case of the present invention, on the contrary, the print pattern is required to have an arrangement which is rotated counter-clockwise by 90 degrees. Here, the method for generating the same print pattern is not discussed, but it is assumed that the same print pattern has already been generated by any method by the time the print pattern is arranged in the page memory 204. An erect print pattern is read out and is rotated by 90 degrees for each character. In an alternative method, not only the erect print pattern but also the rotated print pattern are prepared in advance in the character generator 203. Next, the arranging method of the print pattern in the case of the present invention will be described in the following. When a row of characters A, B is transferred from the host computer and the patterns which are rotated by 90 degrees for the respective characters are generated, the arrangements of these characters on the page memory will be described in the following.

First of all, the dot position (Xv, Yv) is determined from the addresses of the character code A, which are generated by the host computer, and the bit address A1 of such a position on the page memory as has been rotated by 90 degrees and as is to be really addressed is determined in accordance with the foregoing transformation Equation.

For example, it is assumed that the character is composed of 32=33 dots and that the dot row of each print pattern along the scanning direction of the laser is called the "dot line" such as the 0th dot line, the first dot line, ---, and the 31st dot line in the order from above. At first, the 31st dot line of the print pattern is written in up to the addresses A1 to A1+31. Next, the 30th line of the print pattern is written in up to (A1−3200) to (A1−3200)+31. These writing operations are subsequently continued until the 0th dot line of the print pattern is written in the addresses (Ai−3200×31) to (Ai−3200×31)+31. A next reference address A2 is determined by subtracting 3200 from the leading address of the dot line of the preceding character, which has been finally written.

Figure 6:
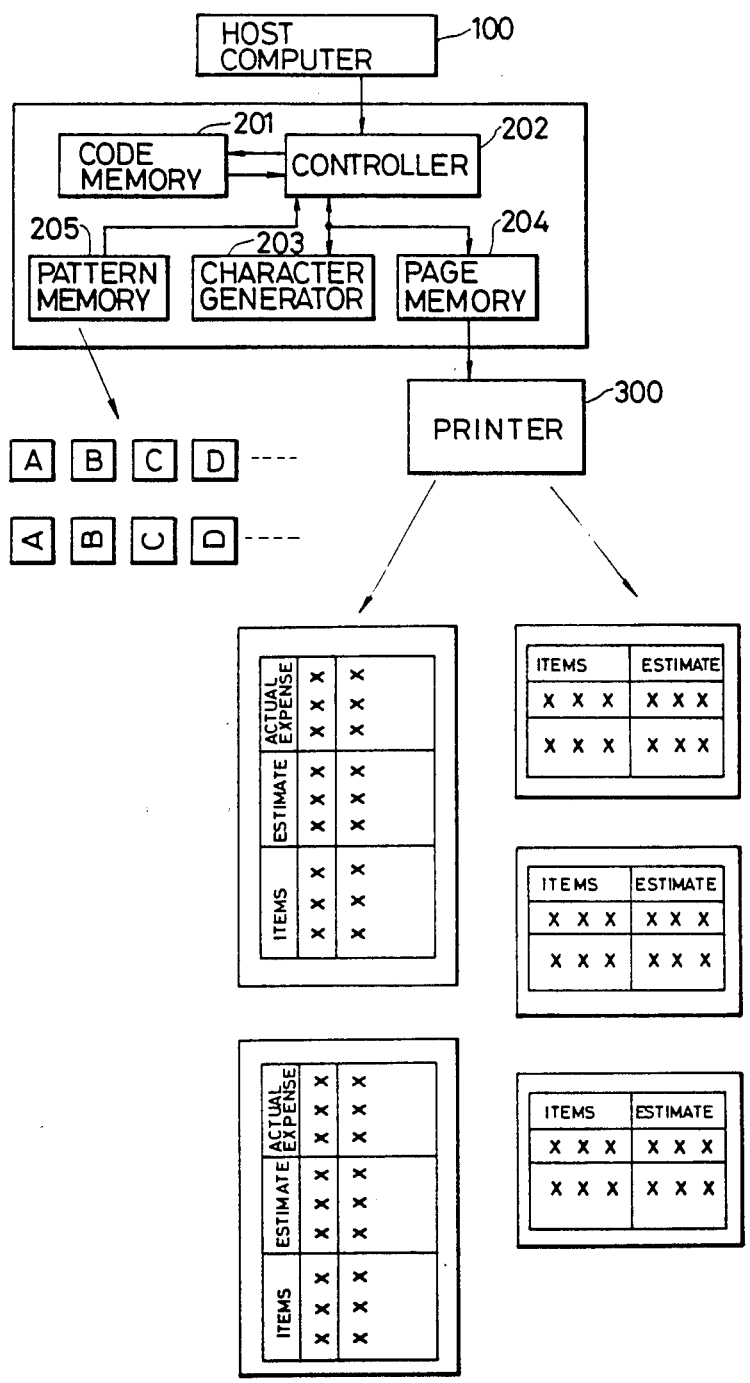
FIG. 6 is a block diagram showing one embodiment of the present invention.

One embodiment of the present invention will be described with reference to the accompanying drawings. FIG. 6 shows the addition of a print pattern memory 205 to the construction of a printer controller 200 of FIG. 2. The print pattern memory 205 is a backup memory of the character generator 203 and may be exemplified by a disc memory which has a larger memory capacity but a longer access time than the character generator 203. In the print pattern memory, both a set of the print patterns which have the usual erect character direction and a set of the print patterns which are the same but rotated counter-clockwise by 90 degree are stored. The character generator 203 is a memory which can be rewritten. The printer 300 is equipped with a mechanism which can feed print paper of the cut type.

Prior to the printing operation, either of the aforementioned sets of the print patterns is selectively read out of the print pattern memory 205 and written in the character generator 203 in accordance with the control information indicating the rotational transformation as called for by the host computer 100. Next, the set of print patterns, which have been rotated counter-clockwise by 90 degrees in accordance with the aforementioned information indicative of the rotational transformation is used to arrange the print pattern in the page memory 204 in accordance with the aforementioned method of the present invention.

Figure 7:
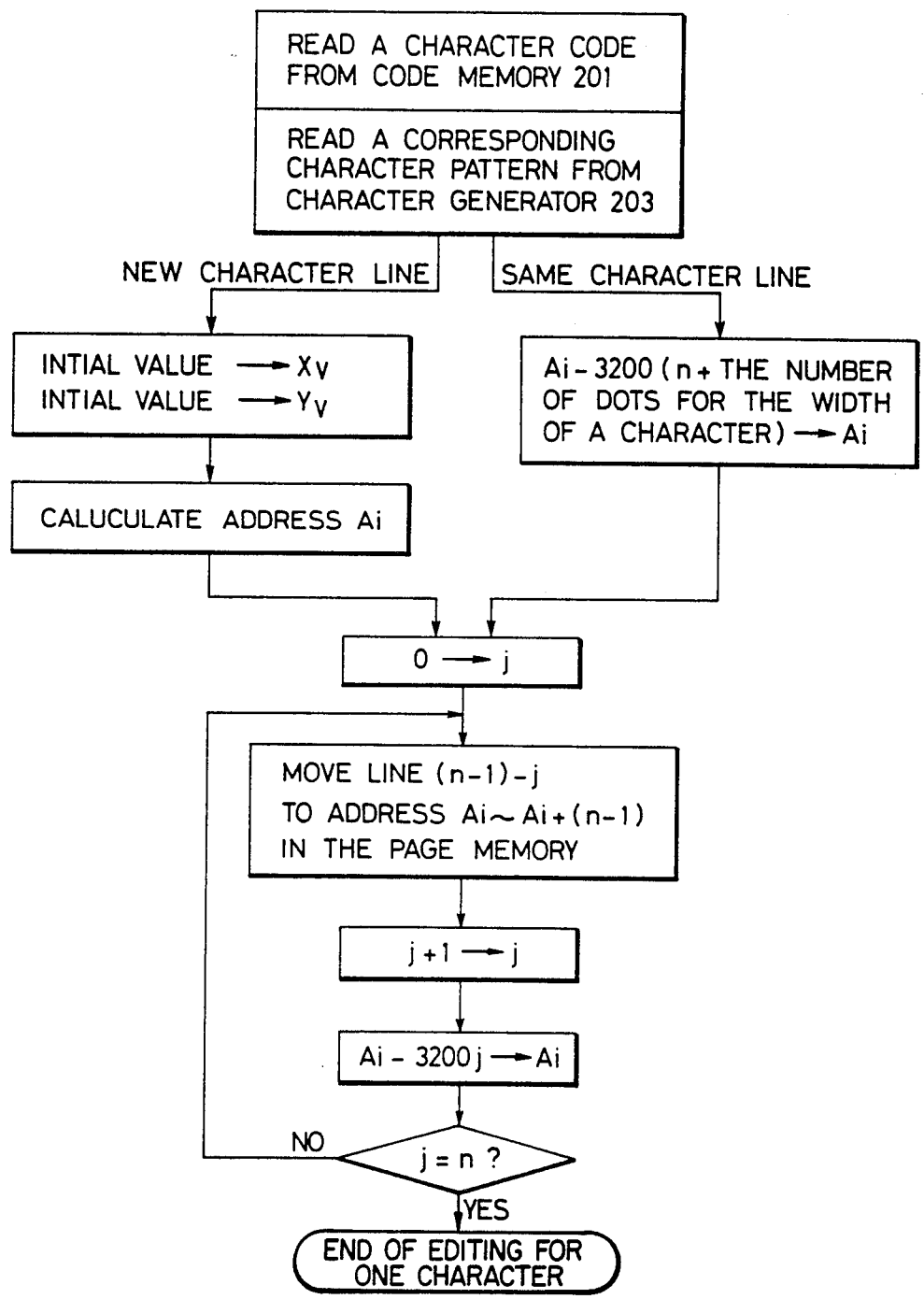
FIG. 7 is a flow chart showing the processings of a controller of FIG. 6.

FIG. 7 illustrates a portion of the processing program which is to be executed at the controller 202, and is a flow chart illustrating a specific example in which one print pattern is arranged on the page memory 204 by the method of the present invention. After the print pattern has been read out of the character generator 203, the initial values of the coordinates Xv and Yv are calculated and set in a counter, in the case of a new character line, and the arranging address Ai is calculated in accordance with the foregoing equation. Next, the number of the dots of the character width is designated at n, and the [(n−1)−j]th line of the print pattern is written from the address Ai of the page memory in the [Ai+(n−1)]th line. When these operations are continued n times for the value j of 0 to (n−1), then one print pattern is arranged on the page memory 204. If the print is made on the same printing line as the previous print pattern, the arranging step of the print pattern is similarly executed after the value Ai has been corrected by [Ai−3200×(n+the number of dots for width of a character)]. Generally speaking, it is quite natural that the values of Xv and Yv have to be corrected (If the value Xv is invariable, only the value Yv has to be corrected) for each start of a new printing line. The print data thus addressed are consecutively read out of the 0th address in the order from the upper lefthand corner of FIG. 5, i.e., the real scanline 0 and are transferred to the printer.

If a laser beam printer having an effective printing width of 13.5 inches (i.e., 343 mm) is used as a specific example of the cut paper, the paper of B4 size (i.e., 257 mm×364 mm) can be printed in the direction of its longer side. Incidentally, the print paper is specifically exemplified by the cut paper. However, it is needless to say that the method of the present invention remains effective even if the print paper is continuous.

The print pattern memory 205 is a non-volatile memory, such as a disc or a floppy disc having a stationary or movable head. Although the embodiment thus far described is directed to the printer controller equipped with the print pattern memory 205, this memory 205 is not necessarily indispensable, and the character generator 203 may be a fixed memory which is incapable of rewriting. In this case, the usual print pattern is exclusively written in the character generator 203 so that the latter print pattern may be dynamically prepared from the former print pattern in accordance with the hardware or program of the controller 202 at the time when the print pattern which is rotated counter-clockwise by 90 degrees is required. One of the advantages coming from the provision of the independent memory such as the print pattern memory is that said memory can be used for another purpose such as for the operation of writing a format such as ruled lines, the title or the mark of a company so as to simultaneously print the format and the text.

According to the embodiment of the present invention, the printing width of the document sheet can be enlarged. Upon this enlargement, that rotating process of the print pattern, which might otherwise exert a high load upon the controller 202, can be omitted to make a contribution to the improvement in the performance of the printer controller partly by providing the print pattern memory 205 and partly by having the two sets of the print patterns, i.e., the usual print pattern and the print pattern which has been rotated counterclockwise by 90 degrees. The print pattern memory 205 converts a portion of the memory, which is mainly used for the storage of the program and the format, into the use of the aforementioned purpose so that its capacity to be occupied by the aforementioned sets of print patterns is limited to a slight ratio.

The present invention can enjoy an effect that the degree of freedom for the printing types of the book can be remarkably improved, while using the existing photosensitive drum as it is, with such a relatively small rise in the production cost as required to add the page memory 204 to the printer controller of the prior art. Moreover, it is not necessary to basically change the existing software for that of the host computer, which is used to ensure the improvement in the degree of freedom.

What is claimed is:

1. A method for generating rotated print pattern, in which print data in the form of character codes having a first arrangement for one page of data is received and converted into a print pattern expressed in terms of dot patterns corresponding to said character codes in which the print data appears in a second arrangement to be printed which is rotated by 90 degrees as compared to said first arrangement, the character codes being located in said first arrangement according to first coordinate information, and in which the dot patterns forming the rotated print pattern are written in a memory for storing the print pattern for one page of data and for allowing the dot patterns of said one-page print pattern to be read out in the order of a predetermined sequence of addresses and to be fed to a printer, comprising the steps of:
    (a) converting a first portion of said print data having said first arrangement into a converted print pattern in which each character code is represented by a dot pattern;
    (b) generating first address signals representing said first coordinate information according to said first arrangement of the print data for each dot of said converted portion contained in said print pattern;
    (c) generating second address signals forming second coordinate information according to said second arrangement of the print data in which the print pattern is rotated by 90 degrees from said first arrangement by converting said first coordinate information to said second coordinate information for each dot of said converted print pattern;
    (d) writing said converted print pattern in locations in said memory in accordance with said generated second address signals; and
    (e) repeating the preceding steps (a) to (d) for another portion of said print data.

2. A method as set forth in claim 1, wherein the steps (b) and (c) are conducted for one dot per one character line of said received print data.

3. A method as set forth in claim 1, wherein said portion of said received print data comprises data for one character.

* * * * *